United States Patent [19]
Klein

[11] Patent Number: 5,131,781
[45] Date of Patent: Jul. 21, 1992

[54] STORAGE RACK WITH IMPROVED BEAM-TO-COLUMN CONNECTOR

[75] Inventor: Herbert H. Klein, Arlington Heights, Ill.

[73] Assignee: Unarco Industries, Inc., Chicago, Ill.

[21] Appl. No.: 653,007

[22] Filed: Feb. 8, 1991

[51] Int. Cl.⁵ .......................... F16B 9/00; A47F 5/10
[52] U.S. Cl. .................................. 403/254; 403/317; 403/329; 211/192
[58] Field of Search ............... 211/192; 403/254, 316, 403/108, 241, 317, 329, 328

[56] References Cited

U.S. PATENT DOCUMENTS

| | | |
|---|---|---|
| 3,273,720 | 9/1966 | Seiz . |
| 3,456,970 | 7/1969 | Sunasky . |
| 3,565,264 | 2/1971 | Guiher . |
| 3,881,829 | 5/1975 | James .................. 403/254 X |
| 3,905,712 | 9/1975 | McConnell ............... 403/317 |
| 3,986,318 | 10/1976 | McConnell ............. 211/192 X |
| 4,074,812 | 2/1978 | Skubic et al. ............ 211/192 |
| 4,165,944 | 8/1979 | Sunasky .............. 211/192 X |
| 4,189,250 | 2/1980 | Abbott et al. . |
| 4,222,542 | 9/1980 | Wilson et al. . |
| 4,285,436 | 8/1981 | Konstant et al. . |
| 4,423,817 | 1/1984 | Monjo-Rufi . |
| 4,536,904 | 8/1985 | Whitehead ............ 403/316 X |
| 4,955,743 | 9/1990 | King . |

Primary Examiner—Peter M. Cuomo
Attorney, Agent, or Firm—Dressler, Goldsmith, Shore, Sutker & Milnamow, Ltd.

[57] ABSTRACT

A novel connector for connecting a beam to a column in a storage rack is disclosed. A flanged member is fitted against the column, with a side flange disposed against a side wall of the column and with a front flange disposed against a front wall of the column. Hooks on the front flange are hooked into apertures of the front wall. An elongate, strip-like spring clip is clipped onto the side flange, which has a recess receiving a bent portion of the spring clip. Another portion is accommodated by a trough extending from the recess. A dimple formed on the spring clip extends into a slot of the side flange. A locking pin affixed to the spring clip extends through an aperture of the side flange and through one of an array of apertures of the side wall.

10 Claims, 1 Drawing Sheet

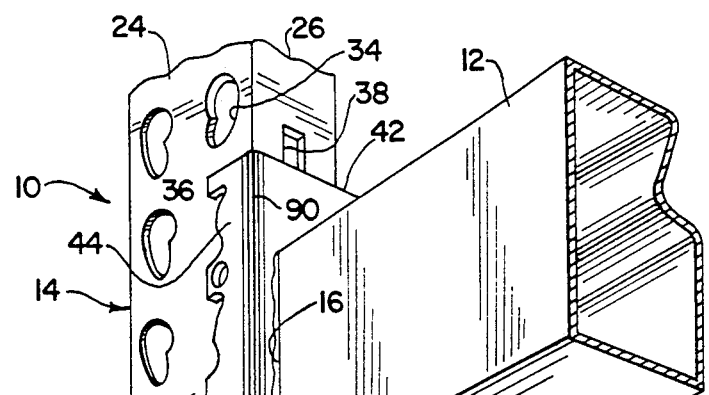
Fig. 1
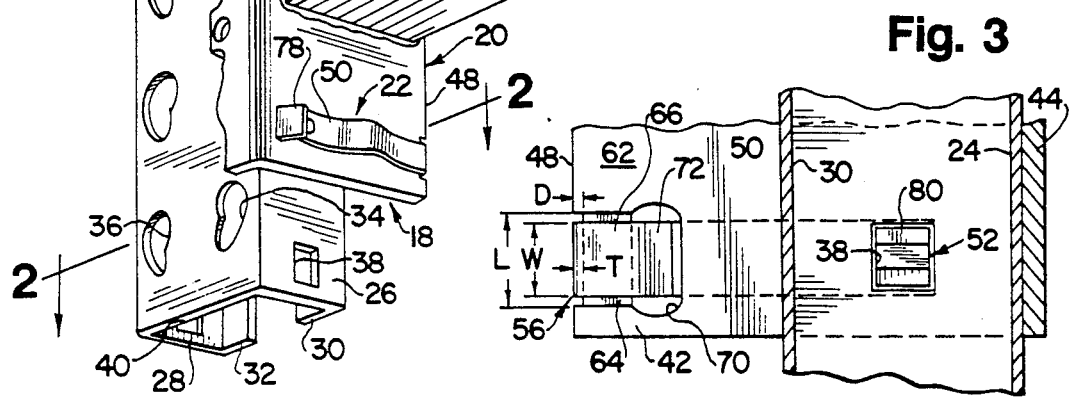
Fig. 3
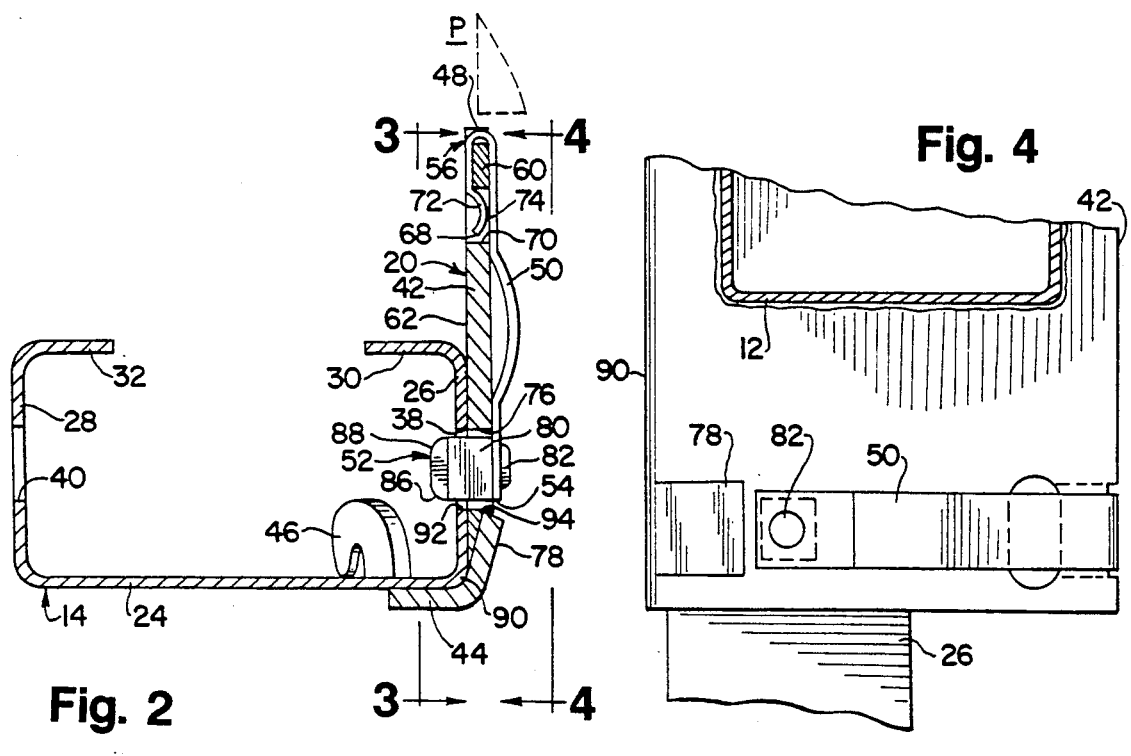
Fig. 2
Fig. 4

STORAGE RACK WITH IMPROVED BEAM-TO-COLUMN CONNECTOR

TECHNICAL FIELD OF THE INVENTION

This invention pertains generally to storage racks, such as pallet racks, and particularly to an improved connector useful in a storage rack for connecting a beam to a column via a flanged member welded to one end of the beam and formed with hooks hooked into apertures of the column. The improved connector locks the flanged member to the column in an improved manner.

BACKGROUND OF THE INVENTION

Commonly, in a storage rack, such as a pallet rack, a beam is connected to a column via a flanged member having a side flange welded to one end of the beam and having a front flange with a linear array of regularly spaced hooks. The flanged member is fitted against the column in an operative position with the side flange disposed against a side wall of the column, with the front flange disposed against a front wall of the column, and with each hook hooked into a respective one of a linear array of regularly spaced apertures of the front wall of the column. Commonly, moreover, the side wall of the column has a linear array of regularly spaced apertures, which differ in their shapes from the apertures of the front wall of the column.

At an early date, it was realized by those skilled in the art that a locking device would have to be provided, which would restrain the flanged member against becoming dislodged accidentally from the operative position by an object, such as a pallet, if the object struck the beam or the flanged member as the object was being lifted near the flanged member. Prior locking devices of a type disclosed sketchily in Guiher U.S. Pat. No. 3,565,264 have been used widely for many years.

A prior locking device of the type noted above comprises an elongate, strip-like, spring clip, which is attached to the side flange of a flanged member, and a locking pin, which is affixed to the spring clip near its distal end. The side flange is welded to one end of a beam. The spring clip has a hairpin bend where the spring clip is clipped over a back edge of the side flange. Near its proximal end, the spring clip is bent to form a flange, which fits into a slot of the side flange. The locking pin extends through an aperture of the side flange of the flanged member and through a selected aperture of the side wall of the column. Hooks on the front flange of the flanged member are hooked into apertures in the front wall of the column. The locking pin has a rounded corner defining a camming surface, which coacts with a rounded corner of the column where the side and front walls adjoin so that the locking pin extending through the aperture of the side flange of the flange member is inserted automatically into the selected aperture of the side wall of the column, upon manipulation of the beam to attach the beam to the column.

Although the prior locking device described above has proved to be generally satisfactory, it has shortcomings. Because of the flange formed near the distal end, the spring clip is difficult to install without overstressing its hairpin bend. The spring clip can be accidentally dislodged if it is struck by an object moving past it. If the spring clip is dislodged, it may become ineffective to restrain the flanged member against becoming dislodged accidentally.

There has been a need, to which this invention is addressed, for an improved connector for connecting a beam to a column via a flanged member integral with one end of the beam and formed with hooks hooked into apertures of the column and for locking the flanged member to the column.

SUMMARY OF THE INVENTION

This invention provides an improved connector for connecting a beam to a column, in a storage rack, in which the column has a front wall with a linear array of regularly spaced apertures and a side wall with a linear array of regularly spaced apertures. The improved connector comprises a flanged member and a locking device. The flanged member has a side flange integral with one end of the beam and a front flange with a linear array of regularly spaced hooks. The flanged member is fittable against the column in an operative position with the side flange disposed against the side wall of the column, with the front flange disposed against the front wall of the column, and with each hook hooked into one of the apertures of the front wall of the column. The locking device is designed to lock the flanged member to the column, in an improved manner, so as to restrain the flanged member against becoming dislodged accidentally from the operative position.

The locking device comprises an elongate, strip-like, spring clip and a locking structure, such as a locking pin affixed thereto, near a distal end of the spring clip. A bent portion of the spring clip enables the spring clip to be clipped onto the side flange. The side flange, at a back edge, has a recess with a depth measured from the back edge and a length measured along the back edge. The bent portion noted above has a thickness not greater than the depth of the recess and a width equal approximately to but less than the length of the recess. The recess is adapted to receive the bent portion noted above so as to protect the spring clip against becoming dislodged accidentally by an object moving past the same portion. The locking structure is adapted to extend through an aperture of the side flange and through one of the apertures of the side wall of the column so as to lock the flanged member to the column in the operative position.

Preferably, the side flange has a substantially uniform thickness near the back edge except for a thinner region extending inwardly from the recess. The thinner region defines a trough, which is adapted to accommodate a portion of the spring clip between a proximal end of the spring clip and the bent portion, so as to protect the spring clip against becoming dislodged accidentally by an object moving past the portion accommodated by the trough. Preferably, the side flange has a tab, which is disposed to protect the spring clip against becoming dislodged by an object moving past the distal end of the clip. In a preferred construction, the side flange has a slot spaced from the recess by the thinner region, and the spring clip is formed near the proximal end with a formation adapted to extend into the slot. Preferably, the formation is a dimple, which has a curved surface adapted to engage the side flange so as to facilitate clipping the spring clip onto the side flange at the recess.

These and other objects, features, and advantages of this invention are evident from the following description of a preferred embodiment of this invention, with reference to the accompanying drawings.

BRIEF DESCRIPTION OF THE DRAWINGS

FIG. 1 is a fragmentary, perspective view of a beam, a column, and an improved connector for connecting the beam to the column, in a storage rack constituting a preferred embodiment of this invention.

FIG. 2, on a larger scale, is a sectional view taken along line 2—2 of FIG. 1, in a direction indicated by arrows.

FIG. 3 is a fragmentary, sectional view taken along line 3—3 of FIG. 2, in a direction indicated by arrows.

FIG. 4 is a fragmentary, elevational view taken along line 4—4 of FIG. 3, in a direction indicated by arrows.

DETAILED DESCRIPTION OF PREFERRED EMBODIMENT

As shown in the drawings, a storage rack 10 constitutes a preferred embodiment of this invention. In the storage rack 10, a steel beam 12 of a known construction is connected to a steel column 14 of a known construction, at one end 16 of the beam 12, by an improved connector 18 comprising a flanged member 20, which is connected to the column 14 in a known manner described below, and a locking device 22, which locks the flanged member 20 to the column 14 in an improved manner. The locking device 22 restrains the flanged member 20 against becoming dislodged accidentally.

The column 14, which extends vertically when the storage rack 10 is erected, is fabricated from a steel plate so as to have a front wall 24, two side walls 26, 28, which extend backwardly from the front wall 24, and two back flanges 30, 32. The back flange 30 extends inwardly from the side wall 26. The back flange 32 extends inwardly from the side wall 28. The front wall 24 is provided with two parallel, linear arrays of regularly spaced, teardrop-shaped apertures 34, 36, the apertures 34 being mirror images of the apertures 36. The side wall 26 is provided with a linear array of regularly spaced, generally rectangular apertures 38, each aperture 38 corresponding to one of the apertures 34. The side wall 28 is provided with a linear array of similarly spaced, generally rectangular apertures 40 similar to the apertures 38, each aperture 40 corresponding to one of the apertures 36.

The flanged member 20, which is fabricated from a steel plate, has a side flange 42, which is perpendicular to the beam 12 and which is integral with the end 16 of the beam 12, and a front flange 44, which has a linear array of regularly spaced hooks 46 (one shown) spaced from one another as the apertures 34 of the front wall 24 of the column 14 are spaced from one another. Preferably, as shown, the side flange 42 is welded to the end 16 of the beam 12. The flanged member 20 is fitted against the column 14 in an operative position with the side flange 42 disposed against the side wall 26 of the column 14, with the front flange 44 disposed against the front wall 24 of the column 14, and with each hook 46 hooked into one of the apertures 34. Thus, the beam 12 is connected to the column 14, so as to extend horizontally from the column 14 when the storage rack 10 is erected.

Constructional details of the beam 12 are not critical to this invention. A beam (not shown) similar to the beam 12 may be similarly connected to the column 14, via the apertures 36 of the front wall 24 of the column 14, so as to extend oppositely from the column 14.

The locking device 22 comprises an elongate, strip-like, spring clip 50 and a locking pin 52 affixed to the spring clip 50 near a distal end 54 of the spring clip 50. The side flange 42, at a back edge 48, has a recess 56 with a depth D measured from the back edge 48 and with a length L measured along the back edge 48. The spring clip 50 has a bent portion 58 with a hairpin bend enabling the spring clip 50 to be clipped onto the side flange 42. The spring clip 50, at the bent portion 58 and elsewhere, has a thickness T not greater than the depth D of the recess 56 and a width equal approximately to but less than the length L of the recess 56. Preferably, as shown, the thickness T is less than the depth D. Thus, when the spring clip 50 is clipped onto the side flange 42, the recess 56 receives the bent portion 58 in such manner that no part of the bent portion 58 extends beyond such edge 48, so as to protect the spring clip 50 against becoming dislodged accidentally by an object, such as a pallet P shown fragmentarily (in broken lines) in FIG. 2, if the object moves upwardly or downwardly past the bent portion 58.

Near the back edge 48 and elsewhere, the side flange 42 has a substantially uniform thickness except for a substantially rectangular, thinner region 60 extending inwardly from the recess 56. The thinner region 60, which is defined where the side flange 42 is depressed at one broad surface 62 facing away from the beam 12, defines a trough 64. The trough 64 accommodates a portion 66 of the spring clip 50 between a proximal end 68 of the spring clip 50 and the bent portion 58 so as to protect the spring clip 50 against becoming dislodged accidentally by an object, such as the pallet P, if the object moves upwardly or downwardly past the portion 66 accommodated by the trough 64.

The side flange 42 has a slot 70, which is spaced from the recess 56 by the trough 64. Near the proximal end 68, the spring clip 50 is formed with a dimple 72, which is adapted to extend into the slot 70 when the spring clip 50 is clipped onto the side flange 42 with the bent portion 58 received by the recess 56 and with the portion 66 accommodated by the trough 64. The dimple 72 has a convexly curved surface 74, which is adapted to engage the side flange 42, so as to facilitate clipping the spring clip 50 onto the side flange 42 without overstressing the bent portion 58.

The side flange 42 has a generally rectangular aperture 76, which is spaced from the slot 70. The aperture 76 is disposed so as to be substantially aligned with one of the apertures 38 in the side wall 26 of the column 14 when the beam 12 is connected to the column 14 via the flanged member 20. The distal end 54 of the spring clip 50 overlies the aperture 76 when the spring clip 50 is clipped over the back edge 48 of the side flange 42 with the bent portion 58 received by the recess 56 and with the portion 66 accommodated by the trough 64. The side flange 42 is lanced, as shown, so as to have a tab 78 near the aperture 76, between the aperture 76 and the front flange 44. The tab 78 is bent outwardly, as shown, so as to face away from the column 14 when the flanged member 20 is fitted against the column 14. The tab 78 protects the spring clip 50 against becoming dislodged accidentally by an object, such as the pallet P, if the object moves past the distal end 54 of the spring clip 50.

The locking pin 52 has an elongate body portion 80, which is shaped as a generally rectangular solid adapted to extend through the aperture 76 of the side flange 42, as well as through any of the apertures 38 of the side wall 26 of the column 14. The locking pin 52 has a cylindrical mounting portion 82, which is integral with the body portion 80. The mounting portion 82 is extended through a circular aperture (not shown) of the spring clip 50, near the distal end 54, and is peened so as to mount the locking pin 52 fixedly to the spring clip 50. The locking pin 52 has a transverse camming portion 84, which is integral with the body portion 80, and which has two opposite, rounded edges 86, 88. The rounded edge 86 is disposed toward the bent portion 58 of the spring clip 50.

When the spring clip 50 is clipped over the back edge 48 of the side flange 42 with the bent portion 58 received by the recess 56 and with the portion 66 accommodated by the trough 64, the locking pin 52 extends through the aperture 76 of the side flange 42. When the beam 12 is manipulated so as to fit the flanged member 20 loosely against the column 14, the rounded edge 86 coacts with a rounded corner 90 of the column 14, where the front wall 24 and the side wall 26 adjoin, so as to cam the locking pin 52 outwardly and to flex the spring clip 50 in such manner that the distal end 54 moves away from the side flange 42. Thereupon, as the flanged member 20 is moved so as to be snugly fitted against the column 14, the spring clip 50 flexes oppositely. Moreover, the rounded edge 88 coacts with one edge 92 of the aperture 38 aligned with the aperture 76, namely the edge nearer to the front flange 44, and with an adjacent edge 94 of the aperture 76 so as to cause the body portion 80 of the locking pin 52 to be automatically inserted through the aperture 76 and through the aperture 38 aligned with the aperture 76.

Thus, the locking device 22 locks the flanged member 20 to the column 14, in an improved manner, so as to restrain the flange member 20 against becoming dislodged accidentally from the operative position. The recess 56 receiving the bent portion 58 protects the spring clip 50 against becoming dislodged accidentally by an object moving past the bent portion 58. The trough 64 accommodating the portion 66 of the spring clip 50 between the proximal end 68 and the bent portion 58 protects the spring clip 50 against becoming dislodged by an object moving past the portion 66 accommodated by the trough 64. The tab 78 protects the spring clip 50 against becoming dislodged accidentally by an object moving past the distal end 54 of the spring clip 50.

Various modifications may be made in the preferred embodiment described above without departing from the scope and spirit of this invention.

I claim:

1. In a storage rack, a connector for connecting a beam to a column at one end of the beam, the column having a front wall with a linear array of regularly spaced apertures and a side wall with a linear array of regularly spaced apertures, the connector comprising
   (a) a flanged member having a side flange with a back edge and a front flange with a linear array of regularly spaced hooks, the side flange being integral with the end of the beam and having an aperture, the flanged member being fittable against the column in an operative position with the side flange disposed against the side wall of the column, with the front flange disposed against the front wall of the column, and with each hook hooked into one of the apertures of the front wall of the column, the side flange having a recess at the back edge, the recess having a depth measured from the back edge and a length measured along the back edge, and
   (b) means for locking the flanged member to the column in the operative position so as to restrain the flanged member against becoming dislodged accidentally from the operative position, the locking means comprising an elongate, strip-like, spring clip having a proximal end and a distal end, the spring clip having a bent portion enabling the spring clip to be clipped onto the side flange, the bent portion having a thickness not greater than the depth of the recess and a width equal approximately to but less than the length of the recess, the recess being adapted to receive the bent portion of the spring clip when the spring clip is clipped onto the side flange so as to protect the spring clip against becoming dislodged accidentally by an object moving past the bent portion, the locking means including a locking structure near the distal end, the locking structure being adapted to extend through the aperture of the side flange and through one of the apertures of the side wall of the column so as to lock the flanged member to the column in the operative position.

2. The connector of claim 1 wherein the side flange has a substantially uniform thickness near the back edge except for a thinner region extending inwardly from the recess, the thinner region defining a trough adapted to accommodate a portion of the spring clip between the proximal end and the bent portion so as to protect the spring clip against becoming dislodged accidentally by an object moving past the portion accommodated by the trough.

3. The connector of claim 1 wherein the side flange has a tab disposed to protect the spring clip against becoming dislodged by an object moving past the distal end of the spring clip.

4. The connector of claim 1 wherein the side flange has a slot spaced from the recess by the thinner region and wherein the spring clip is formed near the proximal end with a formation adapted to extend into the slot.

5. The connector of claim 4 wherein the formation is a dimple adapted to extend into the slot, the dimple having a curved surface adapted to engage the side flange so as to facilitate clipping the spring clip onto the side flange at the recess.

6. A storage rack comprising a column, a beam, and means for connecting the beam to the column at one end of the beam, the column having a front wall with a linear array of regularly spaced apertures and a side wall with a linear array of regularly spaced apertures, the connecting means comprising
   (a) a flanged member having a side flange with a back edge and a front flange with a linear array of regularly spaced hooks, the side flange being integral with the end of the beam and having an aperture, the flanged member being fitted against the column in an operative position with the side flange disposed against the side wall of the column, with the front flange disposed against the front wall of the column, and with each hook hooked into one of the apertures of the front wall of the column, the side flange having a recess at the back edge, the recess having a depth measured from the back edge and a length measured along the back edge, and
   (b) means for locking the flanged member to the column in the operative position so as to restrain the flanged member against becoming dislodged accidentally from the operative position, the locking means comprising an elongate, strip-like, spring clip clipped onto the side flange, the spring clip having a proximal end and a distal end, the spring clip having a bent portion enabling the spring clip to be clipped onto the side flange, the bent portion having a thickness not greater than the depth of the recess and a width equal approximately to but less than the length of the recess, the recess receiving the bent portion of the spring clip clipped onto the side flange so as to protect the spring clip against becoming dislodged accidentally by an object moving past the bent portion, the locking means including a locking structure near the distal end, the locking structure extending through the aperture of the side flange and through one of the apertures of the side wall of the column so as to lock the flanged member to the column in the operative position.

7. The storage rack of claim 6 wherein the side flange has a substantially uniform thickness near the back edge except for a thinner region extending inwardly from the recess, the thinner region defining a trough accommodating a portion of the spring clip between the proximal end and the bent portion so as to protect the spring clip against becoming dislodged accidentally by an object moving past the portion accommodated by the trough.

8. The storage rack of claim 6 wherein the side flange has a tab disposed to protect the spring clip against becoming dislodged by an object moving past the distal end of the spring clip.

9. The storage rack of claim 6 wherein the side flange has a slot spaced from the recess by the thinner region and wherein the spring clip is formed near the proximal end with a formation extending into the slot.

10. The storage rack of claim 9 wherein the formation is a dimple extending into the slot, the dimple having a curved surface adapted to engage the side flange so as to facilitate clipping the spring clip onto the side flange at the recess.

* * * * *